(12) United States Patent
Saeki

(10) Patent No.: US 6,310,718 B1
(45) Date of Patent: Oct. 30, 2001

(54) OPTICAL AMPLIFYING APPARATUS FOR DETECTING BREAK POINT IN OPTICAL TRANSMISSION LINES

(75) Inventor: Miwa Saeki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/263,090

(22) Filed: Mar. 8, 1999

(30) Foreign Application Priority Data

Mar. 9, 1998 (JP) .................................................. 10-056482

(51) Int. Cl.$^7$ ...................................................... A01S 3/00
(52) U.S. Cl. ........................ 359/341.2; 356/73.1; 359/110
(58) Field of Search ................................. 359/110, 341, 359/341.2; 356/73.1

(56) References Cited

U.S. PATENT DOCUMENTS

| 5,742,427 | * | 4/1998 | Kakui et al. | 359/341 |
| 5,748,363 | * | 5/1998 | Duck et al. | 359/341 |
| 5,875,054 | * | 2/1999 | Onoda et al. | 359/341 |

FOREIGN PATENT DOCUMENTS

| 2252154 | * | 7/1992 | (GB) . |
| 2267792 | * | 12/1993 | (GB) . |
| 51-93242 | | 2/1975 | (JP) . |
| 2-1631 | | 1/1990 | (JP) . |
| 4-23628 | | 1/1992 | (JP) . |
| 4-51620 | | 2/1992 | (JP) . |
| 4-291525 | | 10/1992 | (JP) . |
| 5-102583 | * | 4/1993 | (JP) . |
| 6-268600 | | 9/1994 | (JP) . |
| 6-268601 | * | 9/1994 | (JP) . |
| WO 97/23964 | * | 7/1997 | (WO) . |

* cited by examiner

Primary Examiner—Mark Hellner
(74) Attorney, Agent, or Firm—McGinn & Gibb, PLLC

(57) ABSTRACT

In an optical amplifying apparatus, a detour optical line is employed in addition to such an optical amplifier for amplifying light having a first wavelength of "λ1" and for outputting the amplified light. This detour optical line is operated in such a detour manner that the light having the first wavelength of "λ1" is selectively entered into the optical amplifier, and also the light having the second wavelength of "λ2" is not selectively entered into the optical amplifier. The light having the first wavelength of "λ1" which constitutes the original signal light may be optically amplified by the light amplifier, and thereafter the amplified signal light is outputted to a rear-sided optical fiber. On the other hand, when a break point occurred in a optical transmission line is detected, while the light having the second wavelength of "λ2" different from the above-described signal light is employed as the test light, this test light is entered from an input terminal of the optical transmission line provided of the front-sided fiber, so that this test light can be transmitted to the rear-sided fiber via the detour optical line without passing through the optical amplifier. The return light which is required to detect the break point and supplied from the rear-sided optical fiber is not propagated to the optical amplifier, but is returned via the detour optical line to the input terminal.

9 Claims, 4 Drawing Sheets

OPTICAL AMPLIFYING APPARATUS FOR DETECTING BREAK POINT IN OPTICAL TRANSMISSION LINES

BACKGROUND OF THE INVENTION

1. Field of the Invention

The present invention is related to an optical amplifying apparatus including an optical amplifier capable of directly optically-amplifying an input signal light, and is related to a method for detecting break points within a light transmission line of the optical amplifying apparatus and an optical transmitting apparatus containing the above-described optical amplifying apparatus, and further related to a bidirectional wavelength division multiplexing optical transmitting apparatus with employment of this optical amplifying apparatus.

2. Description of the Related Art

In middle and long distance optical fiber communication systems, optical amplifiers are employed so as to amplify signal light attenuated in transmission fibers. As optical amplifiers, optical fiber amplifiers and semiconductor optical amplifiers are widely utilized. These optical amplifiers may directly amplify signal light by using rare-earth doped optical fibers as amplification media.

In any of these optical amplifiers, the light is propagated from the input side into which the signal light is inputted, to the output side from which the amplified signal light is outputted. When the light is propagated along the direction opposite to the above-described propagation direction, namely the light is entered from the output side of the optical amplifier to the input side thereof, this optical amplifier is operated under unstable conditions. In the worst case, the oscillation operation occurs, so that the optical amplifier is brought into a very unstable condition. This unstable operation may cause very serious problems in the optical transmission which should be originally carried out under stable condition by the optical amplifier. In general, such optical isolators are arranged on an input side of an optical amplifier and an output side thereof, and these optical isolators may pass the light along the above-described forward direction, but may interrupt the light propagated along the reverse direction.

To investigate a condition of an optical transmission line in an optical transmission apparatus, a loss and a break point are detected which occur in this transmission line. Normally, an optical time domain reflectometer is employed so as to test the loss and the break point of the optical transmission line. However, in an optical transmitting apparatus having plurality of optical repeaters containing optical amplifiers arranged at a half way point of the optical transmission line, the above-explained test is carried out only in such a limited optical transmission line defined from one optical repeater up to another optical repeater adjacent to the first-mentioned optical repeater in order that no optical amplifier is involved in a certain optical transmission line whose condition should be tested. Therefore, the condition test is merely and successively performed only between the adjoining optical repeaters. In other words, there is a problem that the condition test cannot be executed within a single test cycle with respect to the overall optical transmission line defined from one terminal station to the other terminal station.

When an optical amplifier is arranged in an optical transmission line, light cannot be propagated within this optical transmission line along the reverse direction. As a result, there is another problem that a bidirectional wavelength division multiplexing optical transmitting apparatus cannot be constituted in connection with the above-explained problem.

SUMMARY OF THE INVENTION

An object of the present invention is to provide an optical amplifying apparatus and also to provide a transmission-line break point detecting method of an optical transmitting apparatus containing this optical amplifying apparatus, by which even when the optical amplifier is contained in the transmission line, the optical time domain test can be carried out by entering test light from one terminal station.

Another object of the present invention is to provide a bidirectional wavelength division multiplexing optical transmitting apparatus with employment of the optical amplifier, by which even when the optical amplifier is arranged in the optical transmission line, two sets of light having different wavelengths can be transmitted via a single optical fiber in a bidirectional manner.

To solve the above-described problems, an optical amplifying apparatus of the present invention is provided with such a detour optical line for selectively entering the light having a first wavelength $\lambda 1$ into an optical amplifier, and for selectively not entering light having a second wavelength $\lambda 2$ into the optical amplifier, in addition to such an optical amplifier for amplifying the light having the first wavelength $\lambda 1$ which is inputted from an optical input unit, and for outputting the amplified light from an optical output unit.

In the conventional optical amplifying apparatus, when the light which is propagated along the reverse direction is entered into the optical amplifier, the operation of this conventional optical amplifying apparatus becomes very unstable. In the worst case, the oscillating operation will occur. To avoid this difficulty, optical isolators are arranged at front and rear ends of an amplifying optical fiber so as to prevent penetration of the return light. As a consequence, in the case that optical amplifier is arranged in the optical transmission line, the break point cannot be detected by using the optical time domain reflectometer.

To solve this problem, in the optical amplifying apparatus of the present invention, the light having the first wavelength of "$\lambda 1$" which constitutes the original signal light may be optically amplified by the light amplifier, and thereafter the amplified signal light is outputted to the rear-sided optical fiber. On the other hand, when the break point occurring in the optical transmission line is detected, while the light having the second wavelength of "$\lambda 2$" different from the above-described signal light is employed as the test light, this test light is entered from the input terminal of the optical transmission line provided of the front-sided fiber, so that this test light can be transmitted to the rear-sided fiber via the above-explained detour optical path without passing through the optical amplifier. The return light, which is required to detect the break point, supplied from the rear-sided optical fiber is not propagated to the optical amplifier, but is returned via the detour optical path to the input terminal. As a result, while this return light is not entered into the optical amplifier, the return light of the optical transmission path is returned to the input terminal. Then, the variation in the intensity of this return light with respect to the time lapse can be measured.

The above-described detour optical line of the optical amplifying apparatus according to the present invention is arranged by a first wavelength division multiplexer (referred to as "WDM") arranged at a pre-stage of an optical input unit, and a second wavelength division multiplexer arranged at a post stage of an optical output unit, and a detour transmission line for detouring both the first and second wavelength division multiplexers to be connected thereto. The light having the first wavelength λ1 which is entered from the first port of the first wavelength division multiplexer is outputted to the second port, and also the light having the second wavelength λ2 which is inputted from the first port is outputted to the third port. The amplified light which is entered from the fifth port of the second wavelength division multiplexer is outputted to the fourth port, and also the light having the second wavelength λ2 which is entered from the fourth port is outputted to the sixth port. The third port of the first wavelength division multiplexer is connected to the sixth port of the second wavelength division multiplexer by the detour transmission line.

The optical amplifying apparatus, according to the present invention, is further comprised of: a first optical isolator arranged between the first wavelength division multiplexer and the optical input unit, for passing therethrough light which is penetrated from the second port to the optical input unit, and also for interrupting light which is penetrated from the optical input unit to the second port; and a second optical isolator arranged between the optical output unit and the second wavelength division multiplexer, for passing therethrough light which is penetrated from the optical output unit to the fifth port, and also for interrupting light which is penetrated from the fifth port to the optical output unit.

The transmission-line break point detecting method of the optical transmission line apparatus containing the optical transmitting apparatus, according to the present invention, is to detect the break point of the optical transmission line apparatus containing the above-described optical amplifying apparatus and a front-sided optical transmission line connected to the pre-stage of this optical amplifying apparatus. The transmission-line break point detecting method is comprised of: a test light input step for inputting test light containing the light having the second wavelength λ2 from an input terminal of the front optical transmission line; a return light measuring step for measuring intensity of the test light returned from the front optical transmission line as time has elapsed after inputting the test light; and a break-point detecting step for detecting a break point of a transmission line involving the front optical transmission line based upon a change in the intensity of the returned test light.

Furthermore, in the above-described optical transmitting apparatus, this optical transmission line apparatus is further comprised of a rear optical transmission line connected to an output side of the optical amplifying apparatus, while a return light measuring step includes a step for measuring intensity of the test light returned from the rear optical transmission line as time has elapsed after the test light is inputted. A break point detecting step includes a step for detecting a break point of a transmission line involving the rear optical transmission line. With employment of such a step, even when the rear optical transmission line is further connected to the post stage of the optical amplifying apparatus, a break point occurred in this rear optical transmission line may be detected.

A bidirectional wavelength division multiplexing optical transmitting apparatus with employment of an optical amplifying apparatus, according to the present invention, is comprised of: a first optical amplifier for amplifying light having a first wavelength λ1 which is inputted from a first optical input unit and for outputting first amplified light from a first optical output unit; and a second optical amplifier for amplifying light having a second wavelength λ2 which is inputted from a second optical input unit and for outputting second amplified light from a second optical output unit.

Moreover, the bidirectional wavelength division multiplexing optical transmitting apparatus is comprised of first and second wavelength division multiplexers for connecting these first and second optical amplifiers in order that the bidirectional wavelength division multiplexing optical transmission can be carried out. The first wavelength division multiplexer is connected to both the first optical input unit and the second optical output unit, and has a function for selectively outputting the light having the first wavelength λ1 which is entered from a first input/output unit to the first optical input unit, and also another function for selectively outputting the second amplified light which is outputted from the second optical output unit to the first input/output unit. Similarly, the second wavelength division multiplexer is connected to both the second optical input unit and the first optical output unit, and has a function for selectively outputting the light having the second wavelength λ2 which is entered from a second input/output unit to the second optical input unit, and also another function for selectively outputting the first amplified light which is outputted from the first optical output unit to the second input/output unit.

In the bidirectional wavelength division multiplexing optical transmitting apparatus with employment of the optical amplifying apparatus, according to the present invention, in addition, first and second optical isolators are arranged with respect to the first optical amplifier, whereas third and fourth optical isolators are arranged with respect to the second optical amplifier. The first optical isolator is arranged between the first wavelength division multiplexer and the first optical input unit, and has a function for passing therethrough light which is penetrated from the first wavelength division multiplexer to the first optical input unit, and also another function for interrupting light which is penetrated from the first optical input unit to the first wavelength division multiplexer. Similarly, the second optical isolator is arranged between the first optical output unit and the second wavelength division multiplexer, and has a function for passing therethrough light which is penetrated from the first optical output unit to the second wavelength division multiplexer, and also another function for interrupting light which is penetrated from the second wavelength division multiplexer to the first optical output unit.

Similarly, the third optical isolator is arranged between the second optical isolator, the second wavelength division multiplexer and the second optical input unit, and has a function for passing therethrough light which is penetrated from the second wavelength division multiplexer to the second optical input unit, and also has another function for interrupting light which is penetrated from the second optical input unit to the second wavelength division multiplexer. The fourth optical isolator is arranged between the second optical output unit and the first wavelength division multiplexer, and has a function for passing therethrough light which is penetrated from the second optical output unit to the first wavelength division multiplexer, and also another function for interrupting light which is penetrated from the first wavelength division multiplexer to the second optical output unit.

With employment of such an arrangement, the light having the first wavelength λ1 which is propagated along the downlink direction is continuously entered to the side of the first optical amplifier, is amplified by the first optical amplifier, and then is outputted to the rear fiber in the optical amplifying apparatus. On the other hand, the light having the second wavelength λ2 which is penetrated along the uplink direction, namely the reverse direction, is continuously entered to the side of the second optical amplifier, is amplified by the second optical amplifier, and then is outputted in the optical amplifying apparatus. As a result, even when the optical amplifiers are arranged in the optical transmission line, the bidirectional wavelength multiplexing optical transmission can be carried out.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE PREFERRED EMBODIMENTS

Before describing an optical amplifying apparatus according to the present invention, one conventional optical amplifying apparatus will now be explained in order to easily understand the inventive idea of the present invention.

Figure 1:
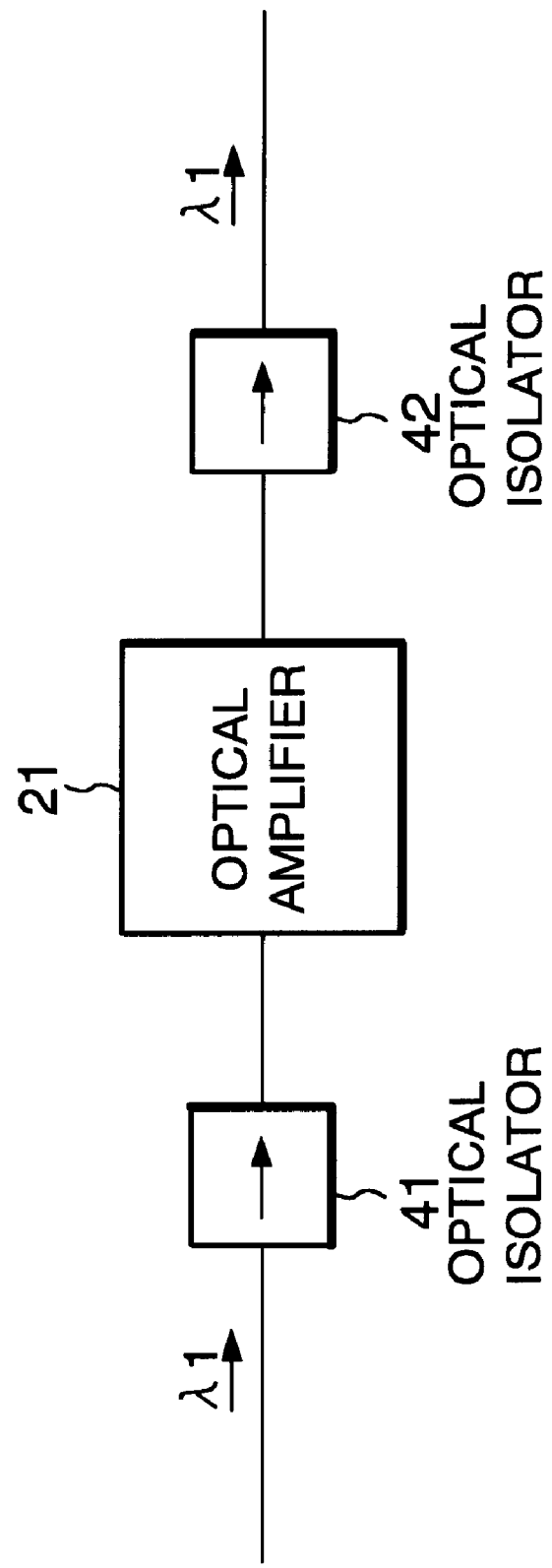
FIG. 1 schematically indicates a block diagram of the conventional optical amplifying apparatus.

FIG. 1 is a schematic block diagram for indicating an arrangement of the above-explained conventional optical amplifying apparatus. As indicated in FIG. 1, optical isolators 41 and 42 are arranged on an input side of an optical amplifier 21 and also on an output side thereof. The function of this isolator 41, or 42 is as follows. That is, light can pass through this isolator only along the forward direction, whereas light passing along the reverse direction is interrupted.

To investigate a condition of an optical transmission line in an optical transmitting apparatus, a loss and a break point occurring in the optical transmission line are detected. Normally, an optical time domain reflectometer is employed so as to test the loss and the break point of the optical transmission line. However, in such an optical transmitting apparatus that a plurality of optical repeaters containing optical amplifiers are arranged in a half way of the optical transmission line, the above-explained test is carried out only in such a limited optical transmission line defined from one optical repeater up to another optical repeater adjacent to the first-mentioned optical repeater in order that no optical amplifier is involved in a certain optical transmission line whose condition should be tested. Therefore, the condition test is merely and successively performed only between the adjoining optical repeaters. In other words, there is a problem that the condition test cannot be executed within a single test cycle with respect to the overall optical transmission line defined from one terminal to the other terminal.

As previously described, when an optical amplifier is arranged in an optical transmission line, light cannot be propagated within this optical transmission line along the reverse direction. As a result, there is another problem that a bidirectional wavelength division multiplexing optical transmitting apparatus cannot be constituted in connection with the above-explained problem.

Referring now to drawings, an optical amplifying apparatus and a bidirectional optical transmitting apparatus with using this optical amplifying apparatus, according to the present invention, will be described.

Figure 2:
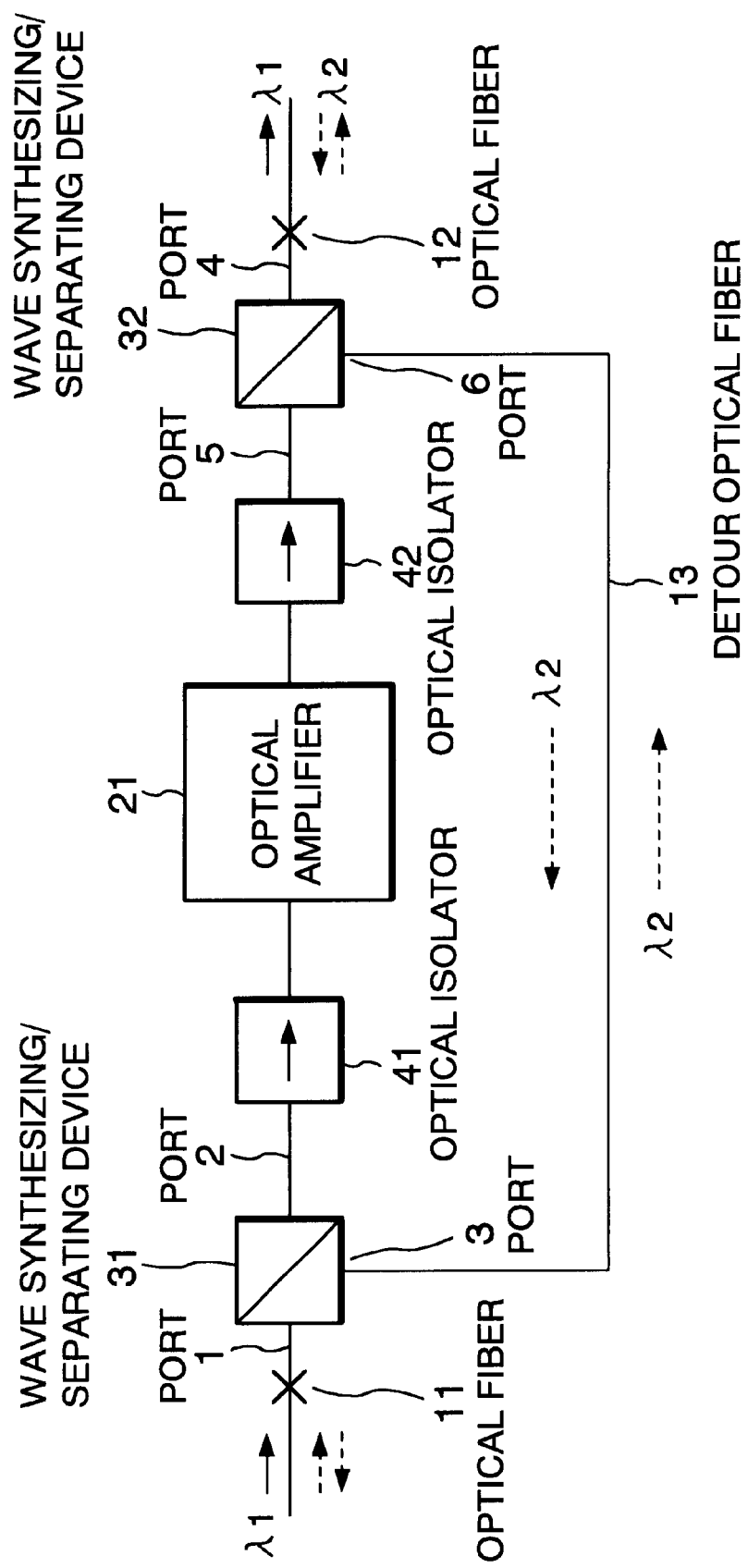
FIG. 2 schematically represents a block diagram of an optical amplifying apparatus according to an embodiment of the present invention.

FIG. 2 is a schematic block diagram for indicating an arrangement of an optical amplifying apparatus according to an embodiment of the present invention. An optical amplifier 21 optically amplifies signal light having a first wavelength of "$\lambda 1$" entered from an input side (namely, left side of FIG. 2), and then outputs the amplified signal light to an output side (namely, right side of FIG. 2). Also, in this embodiment, one optical isolator 41 and another optical isolator 42, which may pass the light only along the forward direction (namely, right direction of FIG. 2), are arranged at a pre-stage of the optical amplifier 21 and at a post stage thereof in order that such light passing along the reverse direction is not entered into this optical amplifier 21. It should be noted that the above-described optical amplifier 21 may be realized by an optical fiber amplifier with employment of an optical fiber to which a rare-earth material such as erbium is doped, or by a semiconductor optical amplifier.

In addition to the above arrangement, in the optical amplifying apparatus of this embodiment, wavelength division multiplexer 31 is arranged at a pre-stage of the input-sided optical isolator 41, and another wavelength division multiplexer 32 is arranged at a post stage of the output-sided optical isolator 42. The wavelength division multiplexer 31 arranged at the pre-stage has first to third ports (3 ports), whereas the wavelength division multiplexer 32 arranged at the post stage has fourth to sixth ports (3 ports). The first port of the wavelength division multiplexer 31 is connected to a front-sided optical transmission line which is connected to this optical amplifying apparatus 21, and the second port thereof is arranged on the side of the optical amplifier 21. On the other hand, the fourth port of another wavelength division multiplexer 32 is connected to the side of the optical amplifier 21. The amplified signal light is entered into this fourth port. The fourth port is connected to either a light receiving apparatus or an optical transmission line provided at a post stage. This light receiving apparatus is connected to the optical amplifying apparatus. The third port of the wavelength division multiplexer 31 is connected to the sixth port of the wavelength division multiplexer 32 via a detour optical fiber 13.

Figure 3:
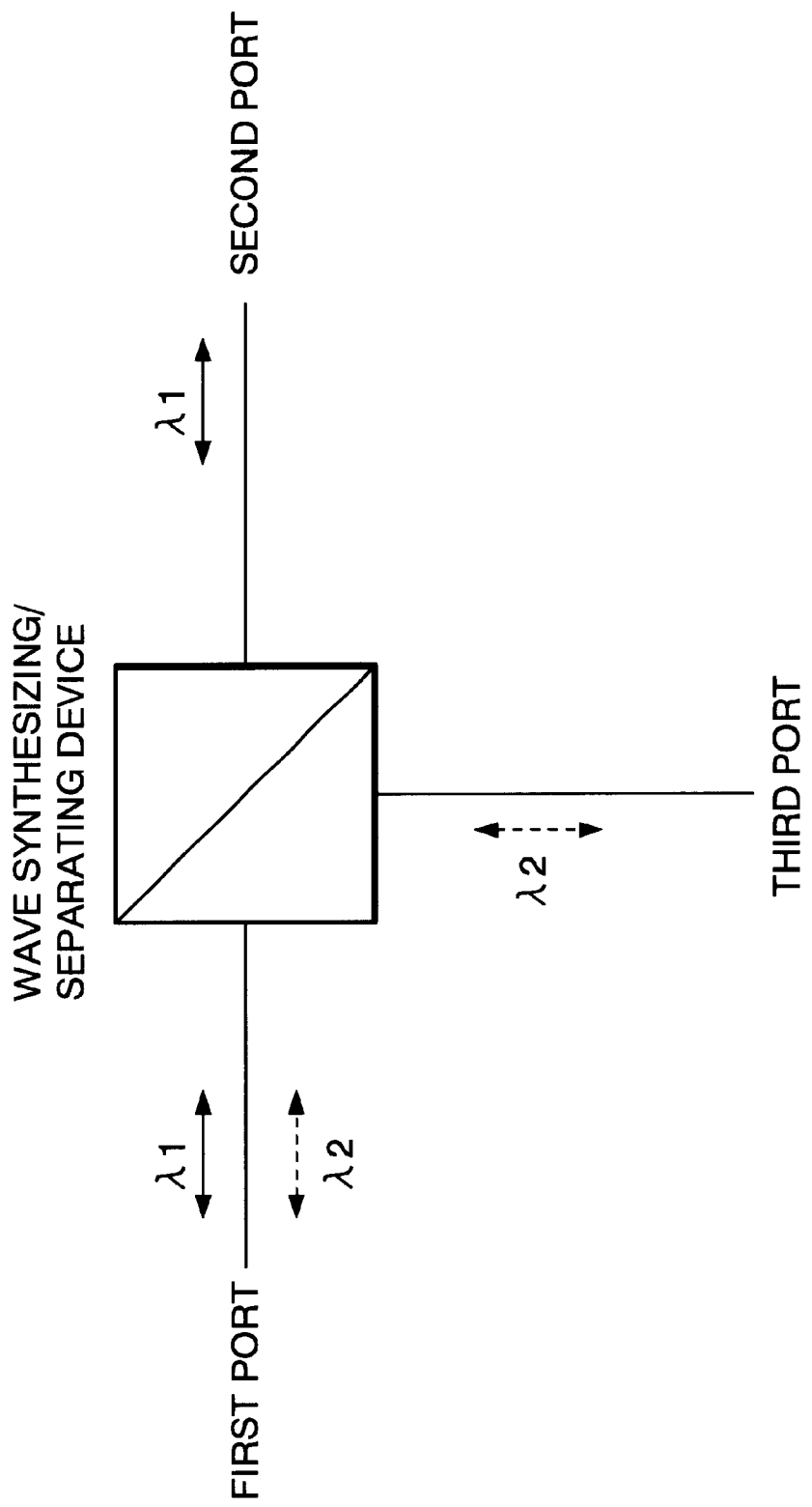
FIG. 3 schematically shows a structure of a wave synthesizing/separating device employed in the optical amplifying apparatus according to the present invention.

As indicated in FIG. 3, the wavelength division multiplexer 31 can pass the signal light having the first wavelength of "$\lambda 1$" only between the port 1 and the port 2, and can pass the signal light having a second wavelength of "$\lambda 2$" only between the port 1 and the port 3. Apparently, the optical couplings are made among the above-described ports irrespective of the light propagation directions, for example, the signal light having the second wavelength of "$\lambda 2$" inputted form the port 3 is outputted from the port 1 in this wavelength division multiplexer 31.

Similarly, in the wavelength division multiplexer 32, the light coupling can be made only between the port 5 and the port 4 with respect to the signal light having the first wavelength of "$\lambda 1$", and also the light coupling can be made only between the port 6 and the port 4 with respect to the signal light having the second wavelength of "$\lambda 2$".

Assuming now that light having a first wavelength of "$\lambda 1$" is inputted as signal light from the port 1 of the wavelength division multiplexer 31 into the optical amplifying apparatus, this signal light is outputted from the port 2, and then this output signal light directly passes through the optical isolator 41. Thereafter, this signal light is entered into the optical amplifier 21. The signal light is optically amplified by the optical amplifier 21 to be outputted as amplified signal light. This amplified signal light passes through the optical isolator 42 and furthermore passes through the wavelength division multiplexer 32, and thereafter this amplified signal light is outputted from this wavelength division multiplexer 32 to the rear-sided optical fiber.

On the other hand, when light having a second wavelength of "λ2" is inputted as test light from the port 1, this test light is outputted from the port 3 of the wavelength division multiplexer 32, and thereafter is entered via the detour optical fiber 13 from the port 6 into the wavelength division multiplexer 32. Then, this test light is outputted from this wavelength division multiplexer 32 to the rear-sided optical fiber. Furthermore, the return light is inputted from the post stage (namely, right side in FIG. 2) into this optical amplifying apparatus. This return light is caused by reflections occurred at the junction point and by the fiber Raman scattering. This return light corresponds to the light having the second wavelength of "λ2". As a consequence, this return light is outputted to the port 6 by the wavelength division multiplexer 32, and thereafter is returned via the detour optical fiber 13 and also another wavelength division multiplexer 32 to the front-sided optical fiber. This return light is returned to the input terminal for the test light of the front-sided optical fiber. Then, the intensity of the return light is measured by the light receiver arranged at this input terminal as time has elapsed.

Since the intensity of this return light, which is varied as time has elapsed, is measured, the break point occurred in the optical transmission line can be detected. In particular, the above-described investigation can be carried out as to the optical transmitting apparatus containing the optical amplifier (conventionally, such an investigation could not be performed). As a consequence, the optical transmission line can be more effectively managed/maintained under stable conditions.

Next, a description will now be made of a bidirectional wavelength division multiplexing optical transmitting apparatus, according to an embodiment of the present invention, with employment of the optical amplifying apparatus of the present invention.

Figure 4:
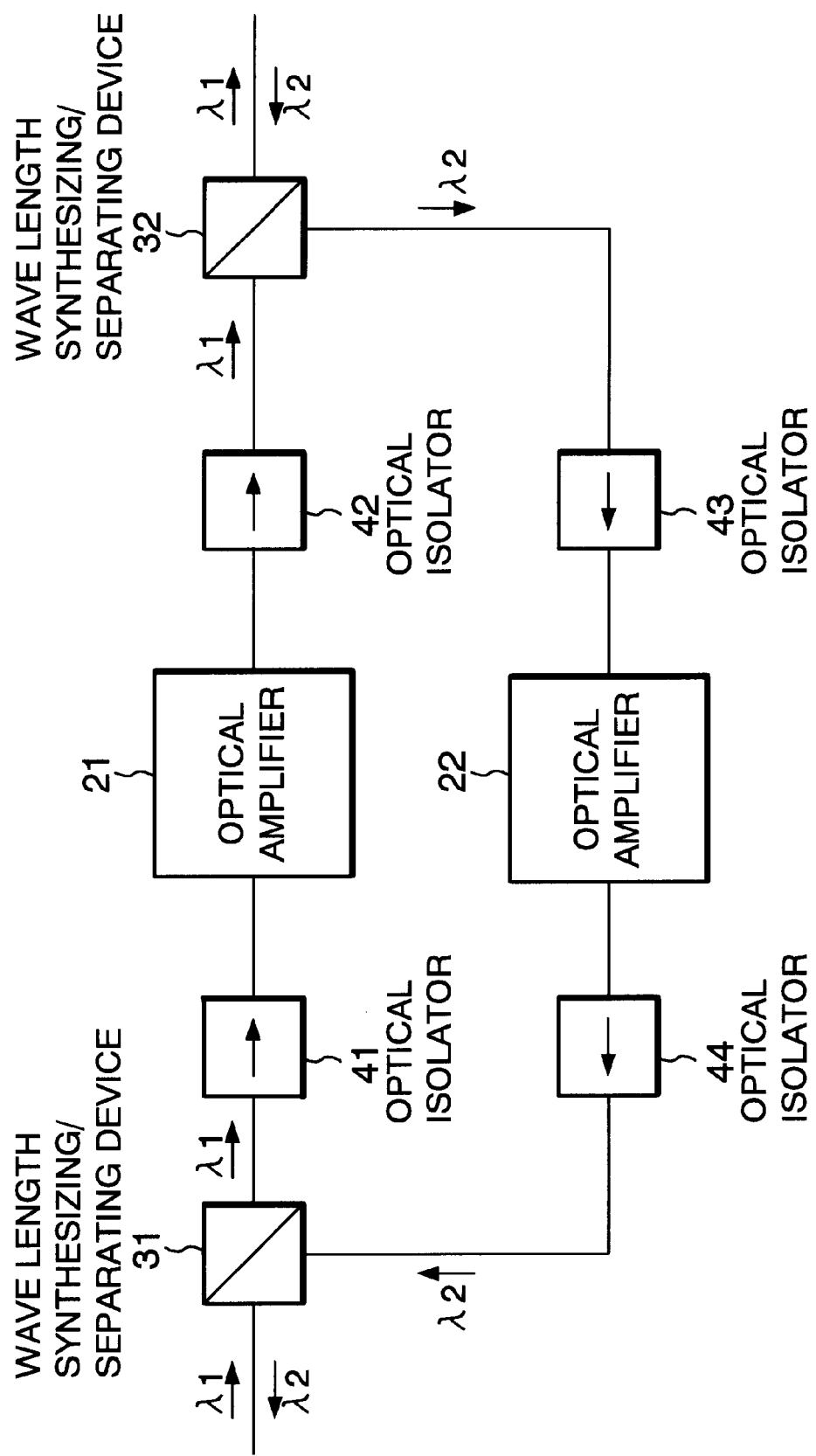
FIG. 4 schematically represents an arrangement of a bidirectional optical transmitting apparatus with employment of the optical amplifying apparatus according to the embodiment of the present invention.

FIG. 4 schematically represents an arrangement of a bidirectional wavelength division multiplexing optical transmitting apparatus, according to an embodiment of the present invention, with employment of the optical amplifying apparatus of the present invention. A basic arrangement of this bidirectional wavelength division multiplexing optical transmitting apparatus is identical to that of the above-explained optical amplifying apparatus according to the present invention. However, different from the optical amplifying apparatus shown in FIG. 2, in this embodiment, an optical amplifier 22 is also arranged in a detour optical line. Moreover, this optical amplifier 22 is set so as to optically amplify light which is propagated along a direction opposite to that of another optical amplifier 21. In other words, optical isolators 3 and 4 are arranged at a pre-stage of the optical amplifier 22 and at a post stage thereof along a direction opposite to that of the optical isolators 1 and 2 in such a manner that light having a second wavelength of "λ2" can pass through this optical amplifier 22, and this light having the second wavelength of "λ2" is propagated along a direction opposite to that of light having a first wavelength of "λ1".

With employment of this arrangement, the light having the first wavelength of "λ1" which constitutes uplink signal light is outputted to the side of the optical amplifier 21 in the wavelength division multiplexer 31. Then, this uplink signal light is amplified by this optical amplifier 21, and the amplified uplink signal light is outputted via another wavelength division multiplexer 32 from this bidirectional wavelength division multiplexing optical transmitting apparatus. On the other hand, the light having the second wavelength of "λ2" which constitutes downlink signal light is outputted to the side of the optical amplifier 22 in the wavelength division multiplexer 32. Then,this downlink signal light is amplified by this optical amplifier 22, and the amplified downlink signal light is outputted via another wavelength division multiplexer 31 from this bidirectional wavelength division multiplexing optical transmitting apparatus. As a result, the light having the first wavelength of λ1 and the light having the second wavelength of "λ2" are entered into the original optical amplifiers so as to be amplified, but are not erroneously entered into the optical amplifiers designed for the counter parties along the reverse directions. Therefore, it is possible to avoid unstable operations of these optical amplifiers. As a consequence, even when the optical amplifiers are arranged in the optical transmission line, the bidirectional wavelength division multiplexing optical transmission can be carried out via a single optical fiber.

As previously described, the optical amplifying apparatus according to the present invention employs the detour optical line in addition to such an optical amplifier for amplifying the light having the first wavelength of "λ1" inputted from the optical input unit and for outputting the amplified light from the optical output unit. This detour optical line is operated in such a detour manner that the above-described light having the first wavelength of "λ1" is selectively entered into the optical amplifier, and also the light having the second wavelength of "λ2" is not selectively entered into the optical amplifier.

Since the above-explained arrangement is employed, the light having the first wavelength of "λ1" which constitutes the original signal light may be optically amplified by the light amplifier, and thereafter the amplified signal light is outputted to the rear-sided optical fiber. On the other hand, when the break point occurred in the optical transmission line is detected, while the light having the second wavelength of "λ2" different from the above-described signal light is employed as the test light, this test light is entered from the input terminal of the optical transmission line provided of the front-sided fiber, so that this test light can be transmitted to the rear-sided fiber via the above-explained detour optical path without passing through the optical amplifier. The return light which is required to detect the break point and supplied from the rear-sided optical fiber is not propagated to the optical amplifier, but is returned via the detour optical line to the input terminal. As a result, while this return light is not entered into the optical amplifier, the return light of the optical transmission line is returned to the input terminal. Then,the variation in the intensity of this return light with respect to the time lapse can be measured.

Accordingly, even in such a case that the optical amplifier is arranged at a half way point of the optical transmission line, while the test light is simply inputted from one terminal station, the break points occurring in the optical transmission lines located at the front/rear sides of the optical amplifier can be detected.

Alternatively, since two sets of light having different wavelengths are employed on the uplink optical signal and the downlink optical signal in the optical amplifying apparatus of the present invention, such a bidirectional wavelength division multiplexing optical transmitting apparatus involving optical amplifiers may be arranged.

While this invention has been described in connection with certain preferred embodiments. It is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical amplifying apparatus, comprising:

a first optical amplifier for amplifying light having a first wavelength $\lambda 1$ which is inputted from an optical input unit, and for outputting the amplified light from an optical output unit; and detour means for selectively entering said light having the first wavelength $\lambda 1$ into said first optical amplifier, and for selectively not entering light having a second wavelength $\lambda 2$ into said first optical amplifier, wherein said detour means comprises:

a first wavelength division multiplexer arranged at a pre-stage of said optical input unit, for outputting said light having the first wavelength $\lambda 1$ which is inputted from a first port to a second port, and also for outputting said light having the second wavelength $\lambda 2$ which is inputted from said first port to a third port;

a second wavelength division multiplexer arranged at a post stage of said optical output unit, for outputting said amplified light which is inputted from a fifth port to a fourth port, and also for outputting said light having the second wavelength $\lambda 2$ which is inputted from said fourth port to a sixth port;

a detour transmission line for connecting said third port of said first wavelength division multiplexer to said sixth port of said second wavelength division multiplexer; and a second optical amplifier for amplifying light having said second wavelength $\lambda 2$, wherein said detour transmission line is connected through said second optical amplifier.

2. The optical amplifying apparatus as claimed in claim 1, further comprising:

a first optical isolator arranged between said first wavelength division multiplexer and said optical input unit, for passing therethrough light which is penetrated from said second port to said optical input unit, and also for interrupting light which is penetrated from said optical input unit to said second port; and a second optical isolator arranged between said optical output unit and said second wavelength division multiplexer, for passing therethrough light which is penetrated from said optical output unit to said fifth port, and also for interrupting light which is penetrated from said fifth port to said optical output unit.

3. The optical amplifying apparatus as claimed in claim 1, wherein said light having the second wavelength $\lambda 2$ which is inputted from said fourth port of said second wavelength division multiplexer is outputted to said first port of said first wavelength division multiplexer.

4. In a transmission-line break point detecting method of an optical transmission line apparatus containing an optical transmitting apparatus, said optical transmitting apparatus comprising:

an optical amplifying apparatus having a first optical amplifier for amplifying light having a first wavelength $\lambda 1$ which is inputted from an optical input unit, and for outputting the amplified light from an optical output unit;

detour means for selectively entering said light having the first wavelength $\lambda 1$ into said first optical amplifier, and for selectively not entering light having a second wavelength $\lambda 2$ into said first optical amplifier; and a front optical transmission line connected to an input side of said optical amplifying apparatus, wherein said transmission-line break point detection method comprises:

inputting a test light containing said light having the second wavelength $\lambda 2$ from an input terminal of said front optical transmission line;

measuring an intensity of said test light returned from said front optical transmission line as time has elapsed after inputting said test light; and detecting a break point of a transmission line involving said front optical transmission line based upon a change in said intensity of said returned test light, wherein said detour means comprises:

a first wavelength division multiplexer arranged at a pre-stage of said optical input unit, for outputting said light having the first wavelength $\lambda 1$ which is inputted from a first port to a second port, and also for outputting said light having the second wavelength $\lambda 2$ which is inputted from said first port to a third port;

a second wavelength division multiplexer arranged at a post stage of said optical output unit, for outputting said amplified light which is inputted from a fifth port to a fourth port, and also for outputting said light having the second wavelength $\lambda 2$ which is inputted from said fourth port to a sixth port;

a detour transmission line for connecting said third port of said first wavelength division multiplexer to said sixth port of said second wavelength division multiplexer; and a second optical amplifier for amplifying light having said second wavelength $\lambda 2$, wherein said detour transmission line is connected through said second optical amplifier.

5. The transmission-line break point detecting method of an optical transmission line apparatus as claimed in claim 4 wherein said optical amplifying apparatus further comprises:

a first optical isolator arranged between said first wavelength division multiplexer and said optical input unit, for passing therethrough light which is penetrated from said second port to said optical input unit, and also for interrupting light which is penetrated from said optical input unit to said second port; and a second optical isolator arranged between said optical output unit and said second wavelength division multiplexer, for passing therethrough light which is penetrated from said optical output unit to said fifth port, and also for interrupting light which is penetrated from said fifth port to said optical output unit.

6. The transmission-line break point detecting method of an optical transmission line apparatus as claimed in claim 4 wherein in said optical amplifying apparatus, said light having the second wavelength $\lambda 2$ which is inputted from said fourth port of the second wavelength division multiplexer is outputted to said first port of said first wavelength division multiplexer.

7. The transmission-line break point detecting method of an optical transmission line apparatus as claimed in claim 4 wherein said optical transmitting apparatus further comprises a rear optical transmission line connected to an output side of said optical amplifying apparatus, wherein said return light measuring includes measuring intensity of said test light returned from said rear optical transmission line as time has elapsed after said test light is inputted, and wherein said break point detecting includes detecting a break point of a transmission line involving said rear optical transmission line.

8. A bidirectional wavelength division multiplexing optical transmitting apparatus including an optical amplifying apparatus of claim 1.

9. An optical amplifying apparatus, comprising:

a first optical amplifier for amplifying light having a first wavelength $\lambda 1$ which is inputted from an optical input unit, and for outputting the amplified light from an optical output unit; and detour means for selectively entering said light having the first wavelength $\lambda 1$ into said first optical amplifier, and for selectively not entering light having a second wavelength $\lambda 2$ into said first optical amplifier, wherein said detour means comprises:

a first wavelength division multiplexer arranged at a pre-stage of said optical input unit, for outputting said light having the first wavelength $\lambda 1$ which is inputted from a first port, for outputting said light having the second wavelength $\lambda 2$ which is inputted from said first port to a third port;

a second wavelength division multiplexer arranged at a post stage of said optical output unit, for outputting said amplified light which is inputted from a fifth port to a fourth port, and also for outputting said light having wavelength $\lambda 2$ which is inputted from said fourth port to a sixth port; and a second optical amplifier for amplifying light having a second wavelength $\lambda 2$ which is inputted from said sixth port, and for outputting the amplified light to said third port.

* * * * *